US006772682B1

(12) United States Patent
Daniel et al.

(10) Patent No.: US 6,772,682 B1
(45) Date of Patent: Aug. 10, 2004

(54) PRESS SHUTHEIGHT ADJUSTMENT USING BOLSTER HYDRAULIC TIE ROD ASSEMBLIES

(75) Inventors: Edward A. Daniel, Fort Loramie, OH (US); W. Craig Brewer, Minster, OH (US)

(73) Assignee: The Minster Machine Company, Minster, OH (US)

( * ) Notice: Subject to any disclaimer, the term of this patent is extended or adjusted under 35 U.S.C. 154(b) by 0 days.

(21) Appl. No.: 10/365,867

(22) Filed: Feb. 13, 2003

(51) Int. Cl.[7] .................................................. F16P 7/00

(52) U.S. Cl. ......................... 100/347; 100/99; 100/257; 72/21.1; 72/446

(58) Field of Search ............................ 100/99, 214, 25, 100/7, 258 R, 347; 72/21.1, 446, 448, 455, 456

(56) References Cited

U.S. PATENT DOCUMENTS

| | | | | |
|---|---|---|---|---|
| 3,400,625 A | | 9/1968 | Wrona | |
| 4,024,807 A | | 5/1977 | Karsen | |
| 4,198,846 A | | 4/1980 | Wrona | |
| 4,307,599 A | | 12/1981 | Wrona | |
| 4,502,379 A | | 3/1985 | Sato | |
| 4,604,930 A | | 8/1986 | Avila et al. | |
| 4,726,754 A | | 2/1988 | Breuker et al. | |
| 4,819,555 A | | 4/1989 | Ballantyne et al. | |
| 5,102,278 A | * | 4/1992 | Herdzina, Jr. ................ | 413/66 |
| 5,285,722 A | | 2/1994 | Schockman | |
| 6,041,685 A | | 3/2000 | Dick | |

* cited by examiner

*Primary Examiner*—Allen Ostrager
*Assistant Examiner*—Shelley Self
(74) *Attorney, Agent, or Firm*—Randall J. Knuth

(57) ABSTRACT

A shutheight adjustment system incorporating tie rods and accompanying hydraulic tie rod nut assemblies in connecting a bed to a bolster of a mechanical press for dynamically altering the tensioning of the tie rods. Each hydraulic tie rod nut assembly includes a cylinder with an inner sliding piston threadably engaging the tie rod. A pressurizing mechanism injects pressurized fluid within a chamber formed by the piston and cylinder. By increasing pressure within the chamber of the hydraulic tie rod nut assembly, compression between the press bed and press bolster may be increased, thereby increasing the press shutheight.

20 Claims, 3 Drawing Sheets

PRESS SHUTHEIGHT ADJUSTMENT USING BOLSTER HYDRAULIC TIE ROD ASSEMBLIES

BACKGROUND OF THE INVENTION

1. Field of the Invention

The present invention relates generally to mechanical presses and, in particular, to a shutheight adjustment mechanism utilizing a bolster hydraulic tie rod assembly to change press shutheight while the press is operating.

2. Description of the Related Art

Mechanical presses, for example, stamping presses and drawing presses, include a frame having a crown and bed with a slide supported within the frame for motion toward and away from the bed. The slide is driven by a crankshaft having a connecting arm connected to the slide. Such mechanical presses are widely used for stamping and drawing operations and vary substantially in size and available tonnage depending upon the intended use.

In prior art presses of this type, the slide is generally connected to the crankshaft by a connection mechanism rod which is adjustable in length. The connecting rod is attached to another member that is adjustable in its relation to the slide so that the shutheight opening between the slide and the bed can be adjusted to accommodate various die sets. A normal slide adjustment mechanism adjusts the slide to a predetermined operating shutheight. Alternatively, the bed portion or bolster of the press may have its position adjusted relative to the slide so as to adjust the shutheight therebetween, as disclosed in U.S. Pat. No. 3,858,432. Regardless of the mode of shutheight adjustment, the slide is generally guided on the uprights of the press frame extending between the crown and the bed so that the parts of the die set remain in precise registration as the slide reciprocates.

A prior art patent, U.S. Pat. No. 4,502,379, shows a press in which shutheight is controlled by adjustment members located between the press crown and bed. Expansion and contraction of the adjustment members was accomplished by supplying hydraulic fluid into the members and thereby changing shutheight.

Another example of press shutheight control is described in U.S. Pat. No. 4,939,918, in which a fluid chamber beneath the lower press die is filled with pressurized oil to cause changes in press shutheight or load.

In mechanical presses utilized in stamping staked laminations, for example, there is a need to maintain shutheight tolerances to within 0.001 to 0.002 inches. Staked laminations are normally utilized in construction of the stator or rotor cores of electric motors. These laminations need precisely stamped surfaces to allow the laminations to be press fit together. Control of press shutheight is also necessary to maintain accurate part tolerances and prolong die life. A particular problem with punch presses is that the press shutheight normally varies with changes in press speed and thermal changes in the press itself.

The present invention is directed to fill the needs and overcome the aforementioned problems associated with mechanical press shutheight adjustment mechanisms wherein it is desired to accurately control shutheight while the press is in operation by controlling the connecting force on the press tie rods.

SUMMARY OF THE INVENTION

The present invention provides an adaptable feedback shutheight system capable of automatically changing the shutheight to compensate for various press conditions.

Generally the invention provides a bolster hydraulic tie rod nut assembly connected to a feedback system that automatically changes press shutheight to compensate for various press changes. The hydraulic tie rod nut is constructed to vary the connecting force between the bolster and the bed applied therebetween in response to changes in an applied hydraulic fluid. While monitoring the press shutheight, the feedback control system changes the pressure communicated to the expandable tie rod nut assemblies, thereby changing the amount of compression between the bed and bolster combination and ultimately press shutheight. Crown movement can be effected in a similar fashion (as set forth in U.S. Pat. 5,285,722 and incorporated by reference herein), permitting yet a further mode of controlling press shutheight.

An advantage of the hydraulic tie rod assembly is that by incorporating the tie rod nut assembly with the monitoring of the shutheight, a feedback system is created to automatically change the hydraulic pressure to the tie rod nut assemblies.

Another advantage of the present invention is that the tie rod nut assembly with its associated feedback system can maintain the press shutheight to within 0.001 inches to 0.002 inches under changing press operating conditions. Further, press shutheight is dynamically controlled while the press is cycling.

An additional advantage of the shutheight adjustment apparatus of the present invention is that the tie rod assembly may be installed easily without any major changes to the press slide drive system.

A further advantage of the shutheight hydraulic tie rod assembly system is that it is possible to retrofit existing presses with the new system for more accurate shutheight adjustment and control.

An even further advantage of the tie rod assembly, being mounted to couple the bed and bolster together, is that the hydraulic tie rod nut assembly, whether mounted adjacent the bed or the bolster, is in an accessible yet generally protected position within the machine press.

A further advantage associated with having a plurality hydraulic tie rod nut assemblies associated with the bolster and bed is that, due to their relative proximity to the press shutheight region, the plurality of hydraulic tie nut assemblies can be more readily used to adjust for variances in shutheight that may occur across the width of the press.

Yet another advantage of the present invention is that it is still possible to preload the press. Preloading the press structure eliminates clearances between press parts, thereby making the press more dimensionally stable.

The invention, in one form thereof, comprises a press in which a crown and bed are attached together by a frame. A slide is attached to the crown for reciprocating movement in opposed relationship to a bolster mounted upon the bed. A plurality of tie rods connect between the bolster and the bed onto which are attached a plurality of pressure-activated tie rod nut assemblies associated with the bed and bolster, so that when activated, the nut assemblies can be used to force the bolster and bed toward one another in order to increase shutheight. A feedback means is connected to a shutheight measuring means and to the tie rod nut assemblies for comparing a predetermined desired shutheight to a measured shutheight. The feedback means activates the tie rod nut assemblies when the measured shutheight deviates from the predetermined shutheight.

A pressure-activated tie rod nut assembly includes a cylinder block having a cylinder bore fit about a tie rod. A piston is threadedly engaged about the tie rod and slidingly disposed within the cylinder bore thereby forming an inner chamber. A tie rod nut is threadably engaged about the tie rod, engaging the piston, so that when the inner chamber is pressurized with a fluid or liquid, the increase in pressure forces the piston and tie rod nut away from the cylinder block, thereby effectively forcing the bed and bolster together.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
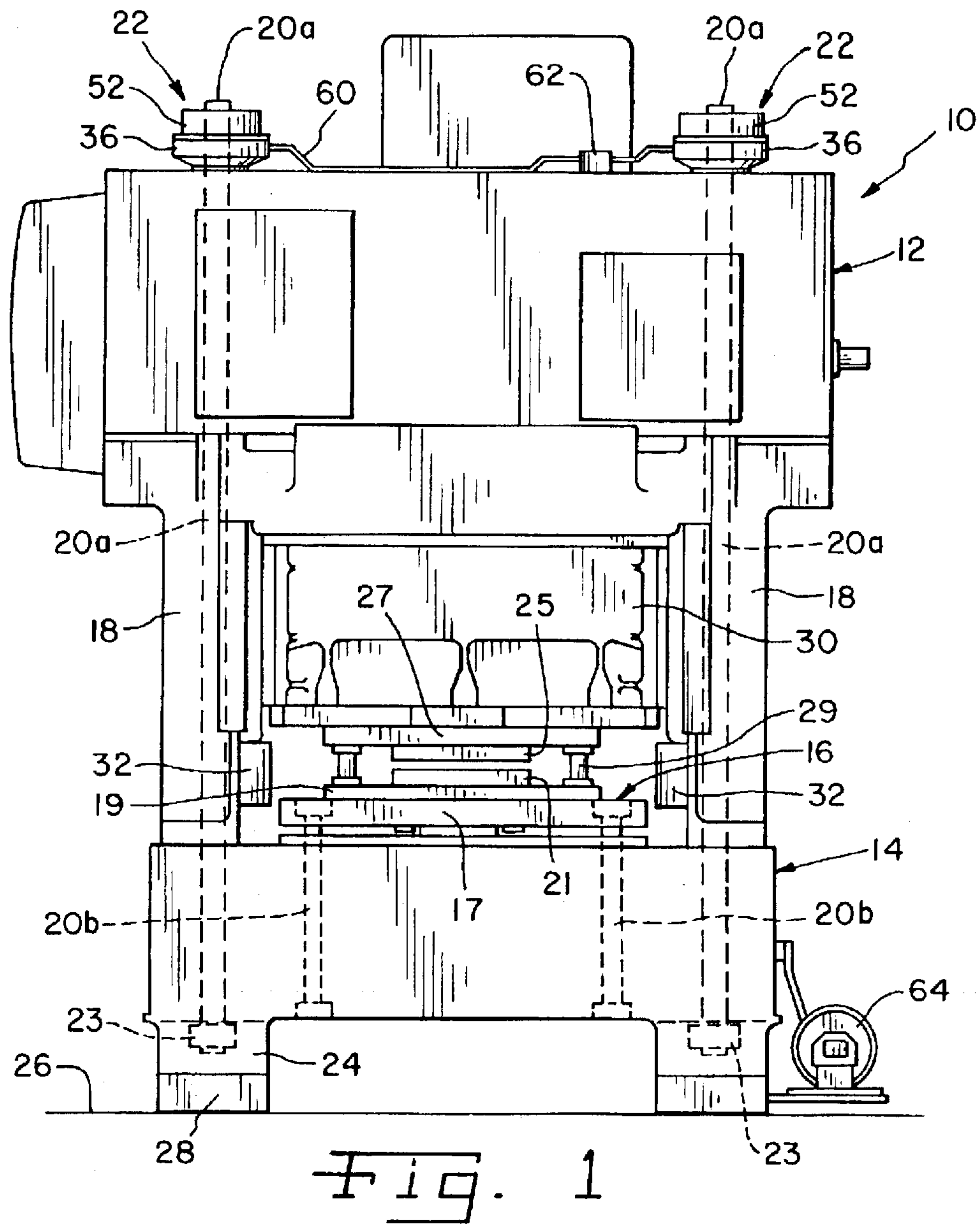
FIG. 1 is a front elevational view of a mechanical press incorporating the shutheight adjustment mechanism of the present invention.
Figure 4:
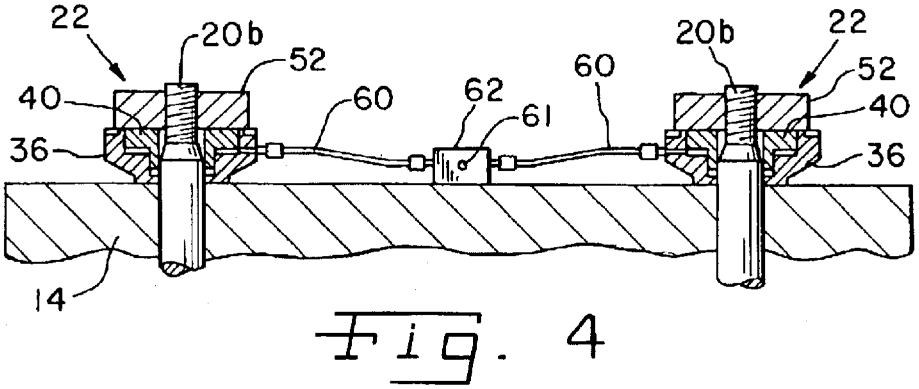
FIG. 4 is an fragmentary enlarged front elevational view of the bed of the mechanical press of FIG. 1.

Referring now to FIG. 1, mechanical press 10 comprises a crown portion 12, a bed portion 14 having a bolster assembly 16 connected thereto and uprights 18 connecting crown portion 12 with bed portion 14. Bolster assembly comprises a bolster 17 having an attached lower die shoe 19 including a die 21. An opposed die 25 is attached to an upper die shoe 27 connecting with slide 30. A plurality of guide posts 29 are disposed between the upper and lower die shoes 25, and 19 in a known fashion.

Uprights 18 are connected to or integral with the underside of crown 12 and the upper side of bed 14. The slide 30 is attached to crown 12 for reciprocating movement in opposed relation to bed 14.

Although press 10 is shown in a press down configuration, it could alternatively be constructed in a press up configuration by constructing the press upside down. In a press up configuration, slide 30 would be connected to the lower unit instead of the top unit, in this case, crown 12. If slide 30 was connected to the lower unit, the lower unit could be referred to as the crown.

Leg members 24 are formed as an extension of bed 14 and are generally mounted on the shop floor 26 by means of shock absorbing pads 28. Tie rods 20*a* extend through crown 12, uprights 18 and bed portion 14, and tie rods 20*b* extend through bed 14 and bolster 16. Additionally, tie rods 20*a, b* are attached on one end with tie rod nut assemblies 22 of the present invention. On the other end of tie rods 20*a, b* are standard, non-expandable tie rod nuts 23. Optionally, although not shown, both ends of tie rods 20*a, b* could each be provided with a tie rod nut assembly 22 to facilitate greater shutheight control.

Press shutheight is controlled by first measuring the shutheight between slide 30 and bolster 16 by a shutheight measuring means 32 such as a limit switch, an accelerometer or a non-contacting optical or electrical sensing means as is known in the art. A preferred non-connecting sensor is an eddy current transducer.

Measurement of shutheight may also be achieved by measuring the pressure loads or vibrations through the press. Alternate methods of measuring shutheight may include monitoring press speed or the quality of workpieces produced by the press. The present invention is directed to improve and supplement current shutheight adjustment mechanisms thereby permitting shutheight adjustment while press 10 is cycling (i.e., adjustment in motion).

Figure 2:
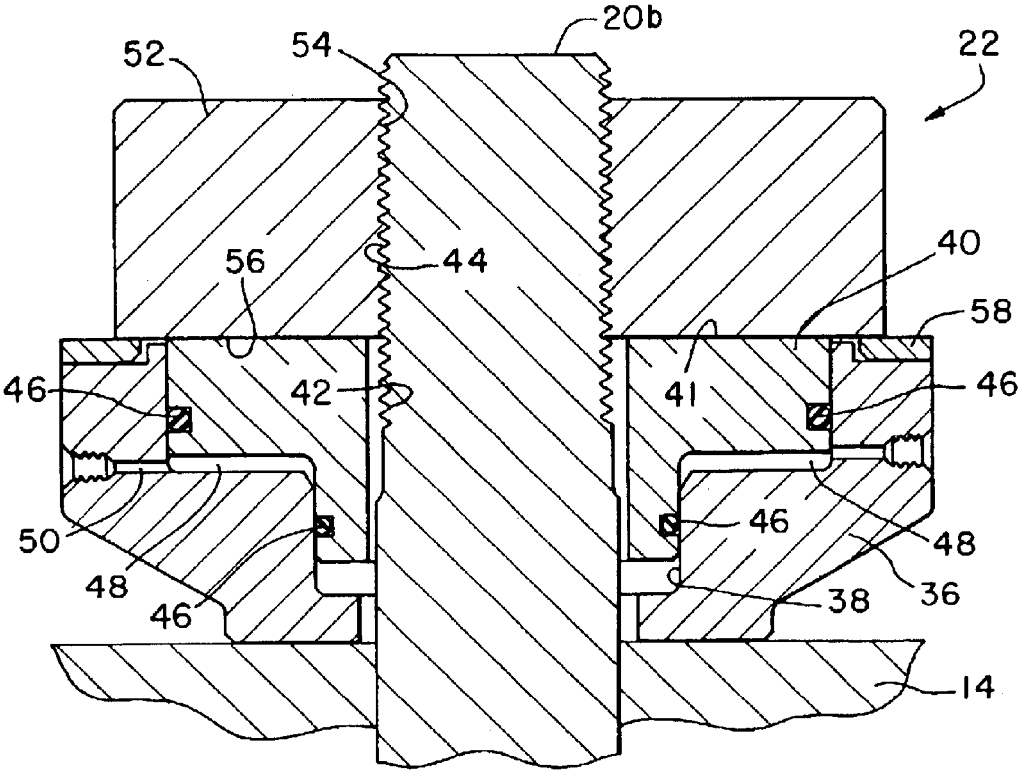
FIG. 2 is an enlarged sectional view of a single hydraulic tie rod assembly of the present invention.
Figure 5:
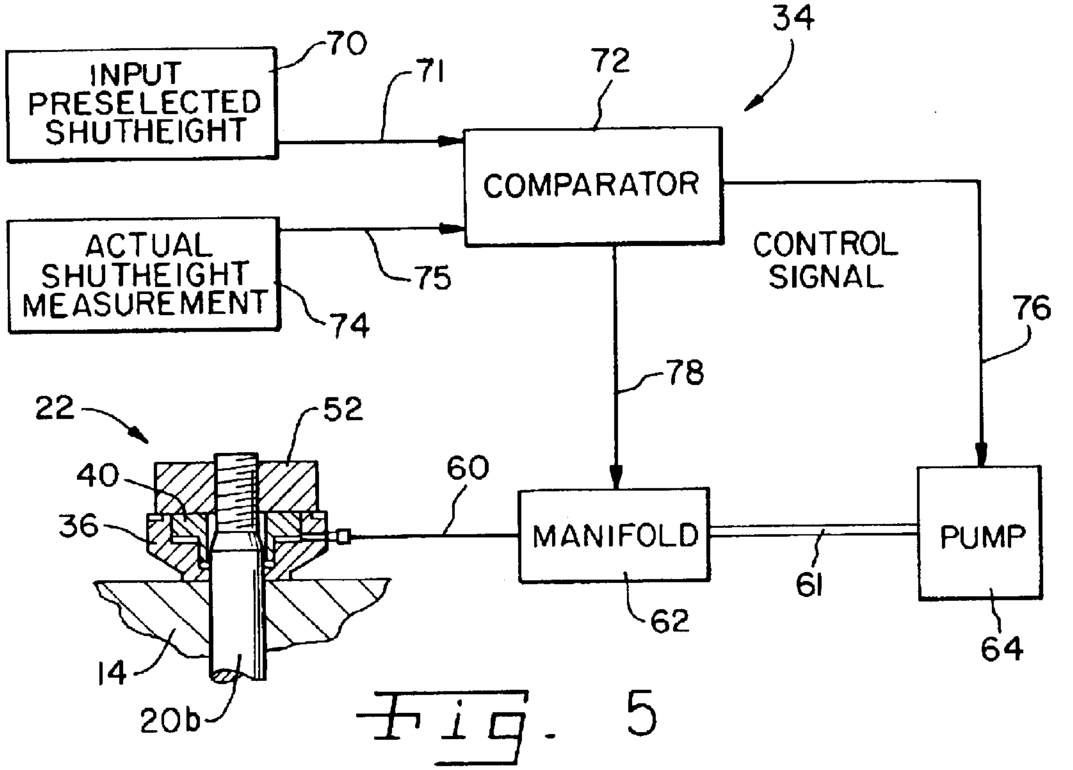
FIG. 5 is a schematic of the feedback means of the present invention.

In the present invention, each hydraulic tie rod nut assembly 22 is connected to a feedback system 34 which receives shutheight input from shutheight measuring means 32 (FIG. 5). Each hydraulic tie rod nut assembly 22 includes an annular cylinder 36 mounted upon one of crown 12, bolster 16, and bed 14, as appropriate, and about one of tie rods 20*a, b* (See FIG. 2). Cylinder 36 includes an annular bore 38 about tie rod 20*a, b* into which an annular piston 40 is slidingly interfit. Piston 40 includes an annular threaded bore 42 which is threadably engaged on threads 44 of tie rod 20*a, b*. Piston 40 sealingly interfits within bore 38 by means of seals 46. Seals 46 seal between piston 40 and cylinder 36 defining a chamber 48. As shown in FIG. 2, chamber 48 is connected to an oil inlet 50 that is constructed through cylinder 36. Oil inlet 50 is in communication with an oil line 60 in fluid communication with oil purged by a pump 64 (FIG. 5). The present construction permits piston 40 to slide within cylinder 36 based on the pressure of oil injected through cylinder 50.

On piston 40 and about tie rod 20*a, b* is threaded a tie rod nut 52 (as shown on tie rod 20*b* in FIG. 2). Nut 52 includes an annular bore having threads 54 that engage threads 44 of tie rod 20*a, b*. The bottom surface 56 of tie rod nut 52 engages a top surface 41 of piston 40. A metallic preload spacer element 58 is interfit between cylinder 36 and tie rod nut 52 to maintain a selected preload. Spacer 58 is ground or formed so as to be flat and interfit between cylinder 36 and nut 52 with barely any clearance. Spacer 58 will maintain the initial preload of the press in the event that oil pressure within chamber 48 is relieved. Spacer 58 thickness can be calculated on the basis of the theoretical or measured stretching of the tie rod, compression of the crown, uprights and bed of press 10 during operation.

The feedback means for automatically controlling the shutheight will be discussed in relation to FIG. 5. However, it is understood and appreciated that alternative control arrangements may be utilized to control the shutheight and the required hydraulic pressure.

Automatic control of shutheight is maintained by a control feedback means 35 as shown in FIG. 5. Prior to operation, the press operator inputs a preselected shutheight through line 71 into a comparator 72. Feedback means 34 along with comparator 72 may comprise a microprocessor. Alternatively, comparator 72 may be constructed from a programmable logic controller as is known in the art. Comparator 72 receives input signals and provides output or control signals as a function of its inputs.

Shutheight measuring means 32 of FIG. 1 transmits an actual shutheight measurement 74 through line 75 to comparator 72 during press operation. Comparator 72 compares the difference between the preselected shutheight 70 and the actual shutheight 74 and forms a control signal on line 76 to an oil pressurizing means such as oil pump 64. Pump 64 may be a typical air-over-oil pump to variably control the oil pressure within tie rod nut assemblies 22. Pump 64 connects to manifold 62, thereby pumping oil into and controlling pressurized oil therein. Manifold 62 communicates the pressurized oil by oil lines 60 to various hydraulic tie rod nut assemblies 22. The result of the comparison between the preselected shutheight 70 and the actual shutheight measurement 74 causes comparator 72 to vary the control signal on line 76 to pump 64 to vary oil pressure to the hydraulic tie rod nut assembly 22, thereby changing the compression between press bed 14 and press crown 12. Shutheight 25 is controlled by changing the oil pressure within chamber 48.

Alternatively, comparator 72, based on its inputs, may vary and send a control signal on a line 78 to manifold 62 to vary the applied pressure of oil to any particular tie rod nut assembly 22. In this fashion, oil pressure within clearance space 48 may be controlled by a valve selectively opening and closing, such as an electric solenoid valve or throttle as is known in the art. The alternate valve may be integral to manifold 62. If necessary, comparator 72 may control more than one pump 64 and manifold 62.

If comparator 72 determines that the actual press shutheight 74 is too small, a control signal is sent through line 76 to cause pump 64 to increase pressure within chamber 48, thereby increasing shutheight by compressing press bolster closer to press bed 14. When the measured shutheight 74 is too large, comparator 72 will signal pump 64 to reduce pressure within chamber 48.

At initial assembly, the press 10 will be preloaded at approximately full press tonnage. During this preload, oil is injected through oil inlet 50 into chamber 48. This oil is then pressurized to approximately 1200 PSI for a typical 100 ton press to approximate the full press tonnage. During the preload process, the pressure within chamber 48 will cause piston 40 to slide within bore 38 away from crown 12. As piston 40 slides away from crown 12 forcefully engaging and pressing into tie rod nut 52, a larger space will develop between cylinder 36 and tie rod nut 52. At the full preload pressure, the spacer element 58 of the preload separation between tie rod nut 52 and cylinder 36 is interfit therebetween. The insertion of spacers 58 are used to maintain the gap and preload stress between nut 52 and cylinder 36.

Figure 3:
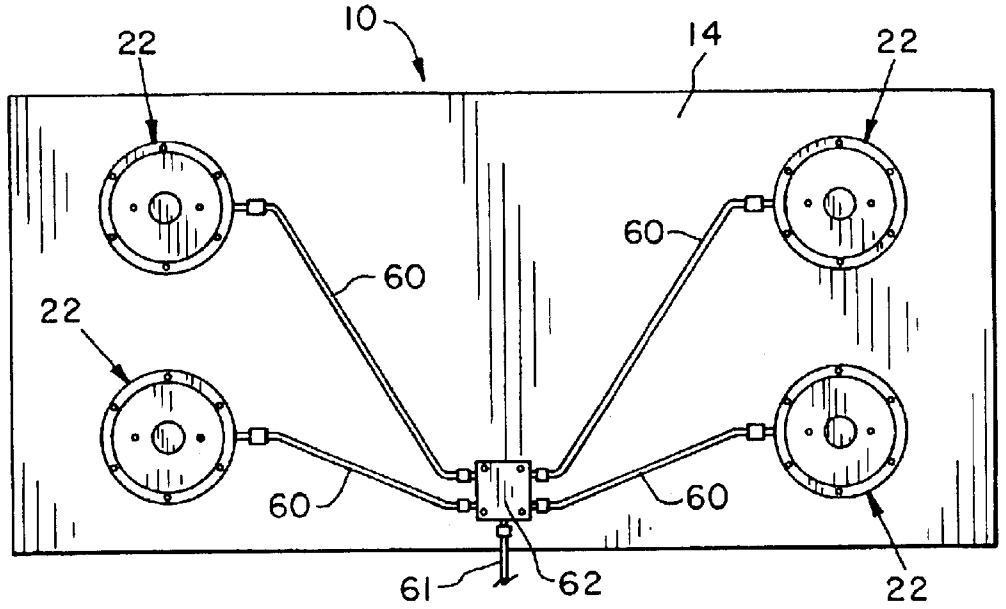
FIG. 3 is a top plan view of the press of FIG. 1 showing four hydraulic tie rod assemblies.

The tie rod nut assembly 22 is preferably attached to each of the tie rods in press 10. As shown in FIG. 3, four tie rod assemblies 22 are attached to the four tie rods **20*b* of press 10. FIG. 3 shows each tie rod nut assembly 22 connected by a high pressure oil hose 60 to a manifold 62. However, it is envisaged that placing tie rod nut assemblies 22 on two or three of tie rods 20*b*** may prove sufficient under certain circumstances.

Figure 6:
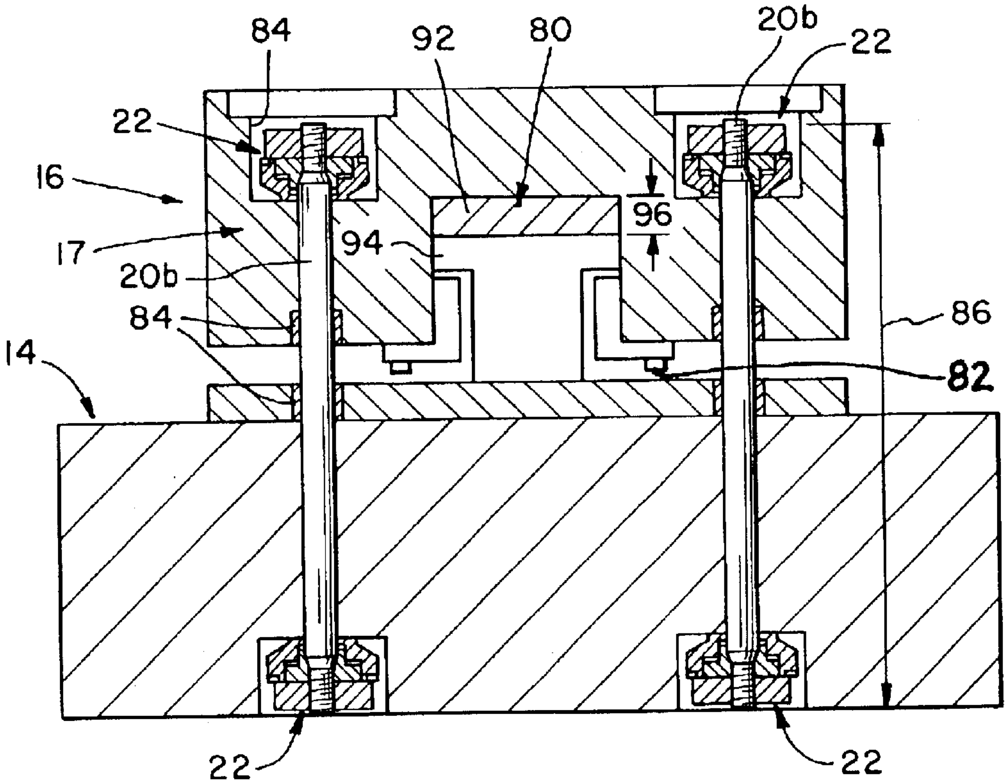
FIG. 6 is a schematic, cross-sectional view of the bed and bolster combination of the present invention.

The details of the combination of bed 14 and bolster 17 are best illustrated in FIG. 6. In addition to bed 14 and bolster 17 (of bolster assembly 16), the combination includes a plurality of tie rods **20*b*, a plurality of tie rod nut assemblies 22, a quick access adjustment mechanism 80, at least one limit stop 82, and guide bushings 84**.

To reduce press shutheight, the operator would use the hydraulic system to increase pressure to adjustment mechanism 80 and decrease or eliminate pressure to the hydraulic tie rod nuts 22. The comparator/monitoring system for automatic shutheight control could use a combination of inputs including pressure at adjustment mechanism 80 and chamber 48.

Each bed 14 and bolster 17 is provided with a plurality of rod receiving channels 88 for receiving corresponding tie rods **20*b*. Additionally, bed 14 and bolster 17 further have a plurality of nut receiving cavities 90 formed therein, each receiving cavity 90 being associated with one of rod receiving channels 88. Each nut receiving cavity 90 faces away from the area between bed 14 and bolster 17**.

Each tie rod **20*b* has an associated tie rod length 86. Pressure-activated tie nut assemblies 22 permit fine tune adjustment of tie rod length 86 (to about 0.010 inches). This fine tune adjustment of the length involves corresponding adjustment of shutheight 74 (i.e., an increase in rod length/tension results in an increase in compression between the bed and bolster, thereby producing a shutheight decrease). In this environment, both the bed and the bolster end of each of tie rods 20*b* is provided with a tie rod nut assembly 22, thereby facilitating a adjustment of the overall length of each tie rod 20*b*** from either end thereof. However, it is also contemplated, although not shown that one of the bed set and bolster set of tie rod nut assemblies could be replaced with a set of standard nuts.

Quick access adjustment mechanism 80 is operatively positioned between bed 14 and bolster 17. Quick access adjustment mechanism 80 is hydraulically controlled, being configured for receipt of an adjustable amount of a hydraulic fluid 92 and being supplied with a quick access piston 94 for acting upon hydraulic fluid 92. The height adjustment achieved with quick access adjust mechanism 80 is referred to herein as quick access height adjustment amount 96, as indicated in FIG. 6. Quick access height adjustment amount 86 can be on the order of inches, thereby allowing relatively easy access to the area between bed 14 and bolster 17. Conversely, quick access height adjustment amount 96 can be reduced to a new order of the required shutheight amount during press operations.

At least one limit stop 82 is provided to act as a limit for the degree of stretching possible within tie rods **20*b* and to act as a limit on the maximum quick access height adjustment amount 96**.

Guide bushings 84 are provided in each rod receiving channel 88 adjacent the interface region between bed 14 and bolster 17. Guide bushings 84 help minimize the vibration of tie rods **20*b***.

The operation of tie rod nut assemblies 22 associated with the bed and bolster combination, in a manner similar to operation of tie rods **20*a* associated with crown 12, uprights 18, and bed portion 14, is controlled via shutheight measuring means 32 in feedback system 34. Further, each hydraulic tie rod nut assembly 22 associated with the bed and bolster combination is advantageously constructed and configured in a manner similar to those described for use with respect to crown 12, upright 18, and bed 14**.

In operation, press shutheight is controlled by first measuring the shutheight between slide 30 and bolster die 16 by a shutheight measuring means 32 such as a limit switch or a non-contacting sensing means such as an eddy current transducer or a laser/photo sensor. The use of multiple shutheight measuring means 32 permits detection of possible variances in shutheight across the press zone.

The present invention improves current shutheight adjustment mechanisms by permitting shutheight adjustment while press 10 is cycling (i.e., adjustment in motion). By comparing the measured shutheight value to a predetermined desired shutheight value, a decision is made whether to increase or decrease the shutheight of the press. Known means for creating this feedback system include programmable logic controllers and standard electronic computers that may be programmed to compare the two shutheight values and provide a signal to actuate a valve or pump (such as air over oil pump 64).

Upon the condition sensed by feedback means 34 that shutheight should be increased, oil pressure within manifold 62 and therefore tie rod nut assemblies 22 is increased. From an approximate preload pressure of 1200 PSI for a typical 100 ton press, the feedback means 34 may vary the pressure from 1200 to 3500 PSI. This range of pressure changes should result in differences of approximately 0.010 inches in shutheight. Conversely, the shutheight can be decreased up to a maximum corresponding to the return of a tie rod to its original prestressed state, achieved by releasing the oil pressure within manifold 62.

As shown in FIG. 1, a shutheight measuring means 32 is incorporated near slide 30. A pressurizing means, such as a pump 64 for pumping pressurized oil, is connected by means of an oil line 61 to manifold 62. Manifold 62 is connected by oil pressure lines 60 to the hydraulic tie rod nut assemblies 22. The feedback means 34 may be directly incorporated on the motor controller 4, motor 64 or on a separate unit.

The shutheight adjustment mechanism described may be installed easily to a press 10 without any changes in the press slide drive. Also, hydraulic tie rod nut assemblies 22 may be retrofitted to existing mechanical presses. By using a noncontacting shutheight measuring means, virtually no structural changes are needed to the press running gear. The feedback system described automatically changes the hydraulic pressure within hydraulic tie rod nuts 22 to vary the shutheight.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A press comprising:

a crown and a bed attached together by a frame, said bed having a bolster attached thereto;

a slide attached to said crown for reciprocating movement in opposed relation to said bed;

a plurality of tie rods connecting between said bolster and said bed;

a plurality of pressure-activated tie rod nut assemblies attached to at least two said tie rods adjacent one of said bolster and said bed so that when activated, said tie rod nut assemblies force said bolster toward said bed;

a shutheight measuring means for measuring the shutheight of said press, said shutheight measuring means associated with said press; and feedback means connected to said shutheight measuring means and said tie rod nut assemblies for comparing a predetermined desired shutheight to the shutheight measured by said measuring means and pressure activating said tie rod nut assemblies when the measured shutheight deviates from the predetermined shutheight, whereby shutheight is controlled.

2. The press of claim 1 in which a tie rod nut assembly comprises:

a cylinder block having a cylinder bore fit about said tie rod;

a piston threadedly engaged about said tie rod and slidably disposed within said cylinder bore, thereby forming an inner chamber, said inner chamber pressurized with a liquid; and a tie rod nut threadably engaged about said tie rod and engaging said piston.

3. The press of claim 2 in which said inner chamber is further defined by seals between said piston and said cylinder block.

4. The press of claim 2 in which said liquid comprises oil.

5. The press of claim 2 in which said tie rod nut assembly includes a spacer interfit between said nut and said cylinder block to maintain a desired preload on said bolster without said tie rod nut assemblies being pressurized.

6. The press of claim 2 having at least two said tie rod nuts assemblies in which said inner chambers of said tie rod nut assemblies are connected together by a manifold.

7. The press of claim 2 in which said feedback means controls the shutheight of the press by altering the pressure within said inner chamber.

8. The press of claim 1 in which said feedback means comprises:

a pump connected to said tie rod nut assemblies and activated by a control signal for changing the pressure of liquid communicated to said tie rod assemblies; and comparator means having input lines for a measured shutheight from said shutheight measuring means and a predetermined desired shutheight, said comparator means including a signal output line connected to said pump, said comparator means causing a control signal to be formed on said output line on the basis of a comparison between a measured shutheight and a predetermined desired shutheight.

9. A press comprising:

a crown and a bed attached together by a frame, said bed having a bolster attached thereto;

a slide attached to said crown for reciprocating movement in opposed relation to said bed;

a plurality of tie rods connecting between said bolster and said bed;

a plurality of pressure-activated tie rod nut assemblies, at least two said tie rods having at least one tie rod nut assembly mounted thereto adjacent one of said bolster and said bed, each said tie rod nut assembly including a cylinder block having a cylinder bore fit about said tie rod, a piston threadedly engaged about said tie rod and slidably disposed within said cylinder bore, thereby forming an inner chamber, said inner chamber pressurized with a liquid, and a tie rod nut threadably engaged about said tie rod and engaging said piston so that an increase in pressure within said inner chamber forces said tie rod nut away from said cylinder block;

a shutheight measuring means for measuring the shutheight of said press, said measuring means operatively associated with said press; and feedback means connected to said shutheight measuring means and to said tie rod nut assemblies for comparing a predetermined desired shutheight to the shutheight measured by said measuring means and altering the pressure within each said inner chamber when the measured shutheight deviates from the predetermined shutheight, whereby shutheight is controlled.

10. The press of claim 9 in which said feedback means includes a pump to pressurize said liquid, said pump controlled by said feedback means.

11. The press of claim 9 in which said feedback means includes a manifold connected to said inner chambers of said tie rod nut assemblies.

12. The press of claim 9 in which said feedback means controls the pressure within each tie rod nut assembly individually.

13. The press of claim 9 in which said liquid is pressurized to between 1200 p.s.i. and 3500 p.s.i.

14. The press of claim 9 in which said tie rod nut assembly includes a spacer interfit between said tie rod nut and said cylinder block to maintain a desired preload on said bolster without said tie rod nut assemblies being pressurized.

15. The press of claim 9 in which said inner chambers of said plurality of said tie rod nut assemblies are connected together by a manifold.

16. The press of claim 9 in which said feedback means comprises:

a pump connected to said inner chambers of said plurality of tie rod nut assemblies and activated by a control signal for changing the pressure of said liquid communicated to said inner chambers of said plurality of said tie rod assemblies; and comparator means having input lines for a measured shutheight from said shutheight measuring means and a predetermined desired shutheight, said comparator means including a signal output line connected to said pump, said comparator means causing a control signal to be formed on said output line on the basis of a comparison between a measured shutheight and a predetermined desired shutheight.

17. A press comprising:

a crown and a bed attached together by a frame;

a bolster attached to said bed at a position intermediate said bed and said crown;

a slide attached to said crown for reciprocating movement in opposed relation to said bolster, said slide and said bolster having a shutheight associated therewith;

a plurality of tie rods connecting said bolster to said bed; and a plurality of pressure-activated tie rod nut assemblies, at least two said tie rods having at least one tie rod assembly mounted thereto adjacent one of said bolster and said bed, each said tie rod nut assembly being configured for selectively adjusting at least one of tolerance and compression between said bed and said bolster to thereby effect a proportional change in the shutheight.

18. The press of claim 17, further comprising a quick access adjustment mechanism for adjusting a relative bolster height of said bolster, said quick access adjustment mechanism being operatively positioned between said bed and said bolster, said quick access adjustment mechanism being hydraulically activated.

19. The press of claim 18, further comprising at least one limit stop associated with one of said bed and said bolster, each said limit stop limiting a degree of relative bolster height adjustment that can be made using said quick access adjustment mechanism.

20. The press of claim 18, wherein said quick access adjustment mechanism and said plurality of tie rod nut assemblies are capable of being used conjunctively to effect the shutheight.

* * * * *